United States Patent [19]

Phelps

[11] 4,335,954
[45] Jun. 22, 1982

[54] COPIER REGISTRATION METHOD AND APPARATUS

[75] Inventor: Russell L. Phelps, Penfield, N.Y.

[73] Assignee: Xerox Corporation, Stamford, Conn.

[21] Appl. No.: 240,428

[22] Filed: Mar. 4, 1981

[51] Int. Cl.³ .......................... G03G 15/00; B65H 9/10
[52] U.S. Cl. ............................. 355/14 SH; 355/3 SH; 271/236; 271/251
[58] Field of Search ...................... 355/3 SH, 14 SH; 271/248, 249, 250, 251, 236, 246

[56] References Cited

U.S. PATENT DOCUMENTS

| | | | |
|---|---|---|---|
| 3,623,806 | 11/1971 | Short | 355/14 |
| 3,630,607 | 12/1971 | Korn | 355/6 |
| 3,888,585 | 6/1975 | Cross | 355/75 |
| 3,908,986 | 9/1975 | Bleau | 271/227 |
| 3,921,974 | 11/1975 | Miciukiewicz | 271/250 X |
| 3,944,366 | 3/1976 | Robertson | 355/76 |
| 4,049,256 | 9/1977 | Church et al. | 271/236 X |
| 4,058,359 | 11/1977 | Urselmann | 355/109 |
| 4,266,762 | 5/1981 | Kramer et al. | 355/3 SH X |
| 4,278,344 | 7/1981 | Sahay | 355/14 SH |
| 4,285,512 | 8/1981 | Shaltz | 355/3 SH X |

OTHER PUBLICATIONS

*Xerox Disclosure Journal*, vol. 5, No. 6, Nov./Dec., 1980, p. 595, "Direct Control Paddle Wheel", Gerald M. Garavuso.

*Primary Examiner*—S. J. Witkowski
*Assistant Examiner*—Keith E. George

[57] ABSTRACT

In a copier, a recirculating document handler having a corner registering mechanism for precisely positioning a document on a platen prior to imaging. The document is initially driven onto the platen and then corner registered against two mutually orthogonal edge guides by a dual paddle wheel drive mechanism. A clamp plate mounted above the platen is then lowered to flaten the document against the platen thereby insuring it is imaged in the copier's depth of field. Once the document is imaged it is side shifted away from one of the edge guides and driven from the platen and stacked in a copier stacking tray. This process of registering, clamping, and removing is repeated for successive documents rapidly enough to have a document throughput of greater than one per second.

13 Claims, 11 Drawing Figures

COPIER REGISTRATION METHOD AND APPARATUS

BACKGROUND OF THE INVENTION

1. Field of the Invention

The present invention relates to a document handling system and more particularly relates to method and apparatus for registering a document on a copier platen.

2. Prior Art

The present invention has particular utility in a copier wherein a document is placed on a platen and illuminated to cause an image of that document to be transmitted to a photoconductive member. The photoconductive member is charged to a uniform electric potential and receipt of light images from the platen dissipates that charge to form a latent image. Light areas or regions on the original dissipate the potential on the photoconductor. Dark or shaded regions of the original cause little or no discharge of the potential.

This latent image is subsequently developed using a powder which is attracted to those photoconductive portions which remain charged. As a result, dark portions of the original correspond to those regions on the photoconductive member which attract powder and light regions of the original attract no developer material. In a typical process the powder image is transmitted or transferred from the photoconductive member to a copy sheet which is then passed through a fuser station to permanently affix an image of the original to the copy sheet. This above-described process is commonly known in the art as xerography.

As the art of xerography has matured, improvements have allowed xerographic copying to be performed more efficiently and has afforded the user flexibility in how the copying is performed. Thus, high speed copiers can rapidly copy a number of original documents with information on both sides and produce collated, two-sided copy sets in a number chosen by the user.

Although high speed copiers can be operated in a manual mode, i.e. the document originals are manually positioned on a platen and individually illuminated, for high speed copying applications, the documents are more typically automatically positioned above the platen. In such high speed applications, a series of document originals are removed from a stack of such documents, driven along an input path to the platen, momentarily stopped on the platen in a registered orientation so that a document image may be formed, and driven from the platen for restacking in a stacking tray. For copying systems wherein the imaging optical systems have limited depth of field, it is also desirable that the original be flattened onto the platen to improve copy clarity. To rapidly yet accurately accomplish these steps, so called recirculating document handlers (RDH) are known. The functioning of one such recirculating document handler is disclosed in U.S. patent application to Sahay Ser. No. 071,613 entitled "Method & Apparatus for Copying Duplex Documents" now U.S. Pat. No. 4,278,344 which has been assigned to the assignee of the present invention. That application is incorporated herein by reference.

Many recirculating document handlers drive the documents onto the platen momentarily, stop document movement as the image is formed and drive them away from the platen without precisely side registering the document. Any side registration of the document that occurs is performed prior to moving the document onto the platen. In such systems, it is assumed that no misregistration or skewing of the document occurs as it is driven from its original position to the platen. This assumption, however, is not always justified with the result that skewed or misaligned copies can occur. If the problem of misaligned documents is to be addressed in a recirculating document environment, a mechanism for registering or positioning the document once it is on the platen is needed.

The prior art has dealt in piece-meal fashion with the various requirements discussed with respect to a high speed RDH operation. The prior art patents of which applicant is aware can be divided into two categories, patents which deal with positioning of the original with respect to the platen, and those patents which are concerned primarily with flattening the document original to ensure the image is within the optical system's depth of field.

The problem of accurately registering an original document on the platen has been recognized in the prior art. Various mechanisms have been utilized to corner register a document along orthogonal registration positions and in particular it is known to drive a document original against two edge registration guides using a rotating drive. U.S. Pat. No. 3,908,986, for example, shows coacting spherical and cylindrical drive members which drive a document into corner registration against two orthogonal guide members. The system disclosed in the '986 patent, however, is to be used with a hand fed copier system and it is questionable whether in a high speed copier it could accurately provide corner registration. U.S. Pat. No. 3,630,607 shows an alternative mechanism for corner registering a sheet. In that patent the cylindrical drive member of the '986 patent is replaced with a series of blades which intermittenty jog the document into a corner registration. Finally, U.S. Pat. No. 4,058,359 shows a drive roller which can be side shifted to properly position a document original along one dimension. The position of the document is first sensed and a control solenoid activated for the purpose of shifting the drive roller from side to side as required to maintain document alignment.

While the three patents discussed above recognize the need to carefully position the document or sheet along two dimensions, none of them addresses the problem of removing a registered document from a platen so that subsequent documents may be copied in order. The manner in which the document is driven away from the platen can be important. If the document is side registered against a registration guide, engagement of a drive mechanism without movement of the original away from the guide can result in damage to the original. There is no suggestion, for example, in the '359 patent to reverse the drive roller's position to remove the document from a registration position so that it may be driven from a platen.

Various patents are known in the art for clamping a document original against a platen to ensure the document is within the optical depth of field of the copier. For example, U.S. Pat. Nos. 3,623,806, 3,944,366, and 3,888,585 disclose various mechanisms for flattening a document original in relation to a platen. None of these references, however, show a high speed clamping mechanism which could be effectively utilized in a high speed document handler. Additionally, none of the references which relate to clamping discusses or discloses any mechanism for achieving a two-dimensional positioning of the document with respect to the platen.

To applicant's knowledge, no mechanism has been described which has the capability for corner registering a document with respect to a platen, followed by a clamping of the document to the platen for imaging which, in turn, is followed by side jogging of the document away from its corner registration position to allow it to be driven from the platen. As noted above, these steps must be performed rapidly and in synchronism and a study of the prior art references discussed above shows no such capability.

SUMMARY OF THE INVENTION

The present invention features method and apparatus for precisely registering a series of documents above a copier platen, ensuring that those documents are within the copier's optical systems depth of field, and removing the document from the platen, all while maintaining the physical integrity of the document original. The invention has particular utility in a high speed copier where the series of steps necessary for accurately imaging the document must be performed rapidly and reliably if document misfeeds are to be avoided.

According to the invention, a series of documents are two-dimensionally registered above a transparent copier platen. The process is initiated when a first document is driven onto the platen and then corner registered into a two-dimensional registration position. After an image of the document is transmitted to a photoconductive member or surface, the document is shifted away from the registration position and driven from the platen. The sequence of movement and imaging steps are then performed for successive original documents as they are copied.

The above sequence of steps ensures that the document is corner registered and, therefore, that the image is properly positioned on the photoconductive member but also ensures that the document is not damaged by driving it away from the platen by first side shifting it away from a registration position.

According to a preferred registration technique, the document is first driven onto the platen utilizing drive rollers which are selectively de-energized by pivoting them away from the document after it has been moved to a initial position on the platen. Once the drive rollers have been disengaged from the document, it is corner registered along two mutually orthogonal or perpendicular directions by a paddle wheel mechanism which engages the document as the drive rollers are pivoted off the document surface. The paddle wheels and drive rollers are coupled to a common support so that the pivoting action can most efficiently be coordinated. Once the document has been corner registered, both paddle wheels and drive rollers are disengaged from the document and it is clamped or flattened so that the document is within the copier's depth of field. After the image is transmitted to the photoconductive member the clamping mechanism is released and the document is side shifted away from its registration position so that the drive rollers can drive it from the platen surface. These steps are performed for successive documents at a rate of speed believed to be greater than the throughput for prior art clamping and/or registration mechanisms.

The pivoting force for the drive rollers and the paddle wheel registration mechanism is transmitted from a camming surface through a cam follower mounted to the support for the drive rollers and the paddle wheel registration mechanism. The camming surface is mounted to a cam shaft which is selectively driven by a main drive shaft through a solenoid activated clutch. Sensors positioned above the platen sense the passage of an original document in its travel to the platen and after a controlled time period corresponding to the time it takes for the drive rollers to move the document entirely over the platen the clutch mechanism is engaged intiating rotation of the cam shaft. Once the cam shaft begins rotation the rollers disengage from the document and the paddle wheels drive it into corner registration.

Another camming surface connected to the cam shaft moves the clamping mechanism so that the document is flattened prior to exposure of the photoconductive surface. This camming surface raises the clamping mechanism once a document exposure has occurred so that the document can be side shifted away from the registration position.

A final cam surface controls side jogging of the drive rollers once an exposure has taken place. During this side shifting, the drive wheels are disengaged from the drive motor so that during the side jog, the document is not driven along the platen exit path. During this side jogging step a detent clutch coupled to the drive motor through a gear mechanism is continually rotating in anticipation of engagement with the drive wheels for removing the document from the platen. Once this last camming surface causes the drive rollers to side jog the document, the detent clutch is engaged causing the drive rollers to begin rotation and, therefore, causing the document to be removed from the platen surface.

These sequence of steps are repeated for subsequent documents to be handled by the document handler. For a typical high speed application the documents may be copied at a rate greater than one document per second so that the entire sequence of steps must be accomplished in well under one second if transit times for the document are to be taken into account. For this reason, all three camming functions are driven by a single cam shaft coupled to the drive motor. The cam shaft is engaged two times during the sequence of events as it will be described subsequently in relation to a detailed description of the preferred embodiment of the invention. The controlled actuation of the cam shaft is accomplished by a micro processor which actuates the solenoid clutch at appropriate intervals.

From the above, it should be appreciated that one object of the present invention is controlled registration of a series of documents at a rapid rate through coordinating a number of process steps as the document approaches, rests on, and leaves a copier platen. The enumerated process steps will enable the copier to operate at high speeds while maintaining document integrity and copy image quality. Other objects and features of the present invention will become better understood when a detailed description of a preferred embodiment of the invention is described in conjunction with the accompanying drawings.

DETAILED DESCRIPTION OF A PREFERRED EMBODIMENT

Figure 1:
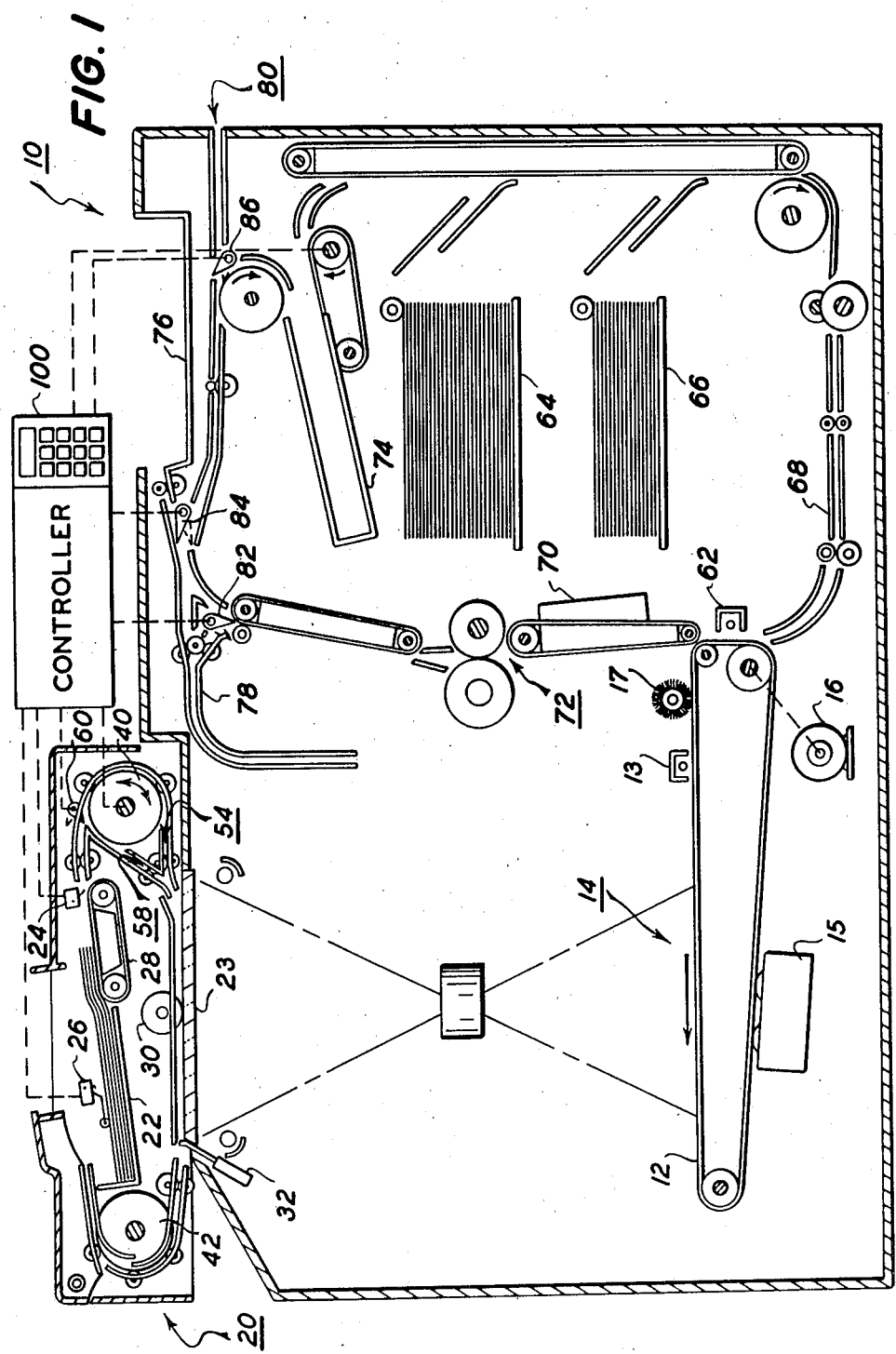
FIG. 1 is a schematic of a copier incorporating a recirculating document handler for delivering multiple documents to a platen surface.

Turning now to the drawings, FIG. 1 shows an exemplary copier 10 including a conventional xerographic photoreceptor belt 12 and a series of conventional xerographic processing stations acting on the belt for respectively charging 13, exposing 14, developing 15, driving 16 and cleaning 17. The copier 10 is adapted to provide duplex or simplex pre-collated copy sets from either duplex or simplex original documents stacked in a recirculating document handler 20. Various steps of the xerographic process are coordinated and monitored under the control of a controller 100.

In the exemplary recirculating document handler (RDH) 20, individual original document sheets are sequentially fed from a stack of document sheets placed by the operator face-down in normal forward collated order in a document stacking and holding tray 22, i.e. with page 1 on the bottom of the stack, face-down. The document sheets are fed from the bottom of the stack seriatim to an imaging station 23, which is the conventional copying platen of the copier 10, to be conventionally imaged onto a photoreceptor 12 for the production of copies in a generally conventional xerographic manner. The documents are stacked initially, and also restacked automatically during each circulation, in the tray 22 over the platen 23. The document handler 20 has conventional switches or other sensors such as 24 for sensing and counting the individual documents fed from the tray 22, i.e. counting the number of document sheets circulated. A conventional resettable bail or finger drops to indicate through its associated switch or sensor 26 the completion of each circulation of the complete document set, by sensing that all the documents have been fed out from under it, and then is automatically reset on the top of the stack before the next circulation. The document feeder 20 is adapted to serially sequentially feed the documents, which may be various conventional sizes and weights of sheets of paper or plastic containing information indicia to be copied on one or both sides, e.g. printed or typed letters, drawings, prints, photographs, etc.. A bottom feeder 28 feeds the bottom-most document sheet, on demand by the controller, from the stack through one of two selected feed paths described below to a platen registration mechanism 30 which moves the document into a registration position over the copier platen 23, where the side of the document facing the platen 23 is copied.

In this document feeder 20 each document is selectably inverted or not inverted as it is fed from the tray 22 to the imaging station 23 through one of two paths selectable by the controller. This selection is accomplished before the document is copied. The two paths here are provided by a selectably reversable sheet driver roller (inverting roller) 40 and a selectable position gate or deflector 60 in the document path. Each document sheet is fed initially from tray 22 around the outside of the roller 40. If the document path is continued around roller 40, it is fed invertedly through a first path 54 onto the platen 23, conventionally. However, the decision gate 60 in the document path here is adjacent the entrance to roller 40 and comprises pivotable, normally raised, deflector fingers which may be lowered after the trail edge of the document has passed this gate. (Switch 24 or another switch can sense the trail edge and start a count of sufficient time for it to pass). Subsequent actuation of the gate 60, together with coordinated reversal of the roller 40, causes the further recirculatory movement of the document to reverse and pass through a second and different transport path 58 to the platen for copying. In the art this is called an "inverter" even though the document is not inverted at this point, as described below. The second transport path 58 provides no sheet inversion between the stack and the platen, whereas the first transport path 54 inverts the document sheet (once) between the stack and the platen.

Figure 2:
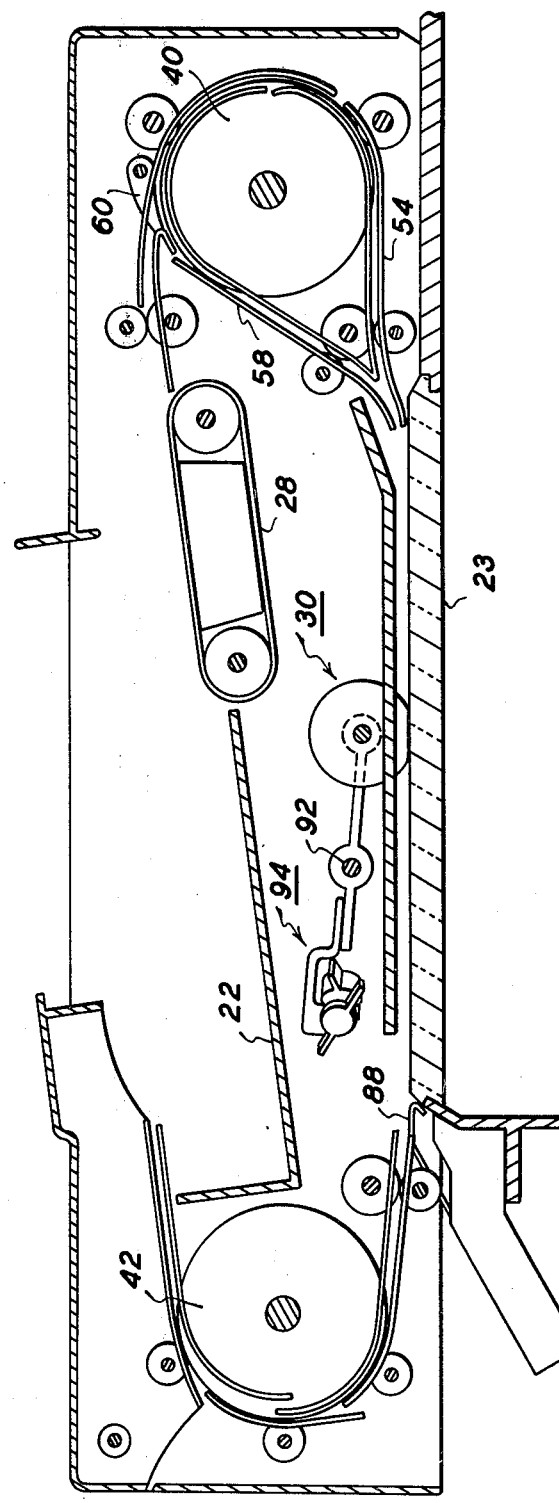
FIG. 2 is a schematic of the FIG. 1 copier's recirculating document handler.

In the inverter operation for path 58, the reversal of the roller 40 causes the documents to only go partially around the roller 40 and then be reversed in direction and fed directly back through the gate 60. The now deflecting down gate 60 (as shown in its solid line position in FIGS. 1 and 2) deflects the document into the path 58 which feeds directly onto the platen 23.

Thus, in this non-inverting path 58, the documents arrive at the platen with the same orientation as their original orientation in tray 22. Simplex documents stacked face-down in the tray 22 will thereby still be face-down when they reach the platen 23 for copying, providing the path 58 is utilized.

In contrast, the first inverting transport path 54 transports the documents unidirectionally and without reversal fully around the roller 40 onto the platen 26. Thus, the orientation or facing on the copy platen 23 of documents fed through the simplex path 54 is inverted from the previous orientation of those documents in the tray 22.

It may be seen that the return path of the documents to the tray 22 from the platen after they are copied is always the same here, regardless of which of the two initial paths 54 or 58 is used. This document return path has one sheet inversion, provided by feeding the documents around a second, but non-reversing, inverting roller document feeding system 42, which also returns the documents to restack on the top of the stack in tray 22.

An image which has been transmitted from the RDH platen 23 to the photoreceptor 12 is subsequently transferred at a transfer station 62. Copy sheets fed from a selected one of a main 64 and auxiliary 66 paper trays are moved along a copy sheet feed path 68 to the transfer station 62. A toner image is transferred to the copy sheets which are then carried by a vacuum transport 70 to a conventional roll fuser station 72 for the fusing of the toner image. From the fuser 72 the copy sheets are delivered to either a duplex tray 74, an output tray 76, an inverter 78 or an output path 80.

The copy sheet path chosen after the fuser 72 depends on the mode of copier operation as selected by the operator. Subsequent to this selection the controller 100 dictates the operation of a number of gates or fingers 82, 84, 86 which direct the copy sheets to an appropriate destination. Further details regarding the paper paths chosen subsequent to fusing may be found in the above referenced U.S. patent application Ser. No. 071,613 to Sahay.

Figure 3:
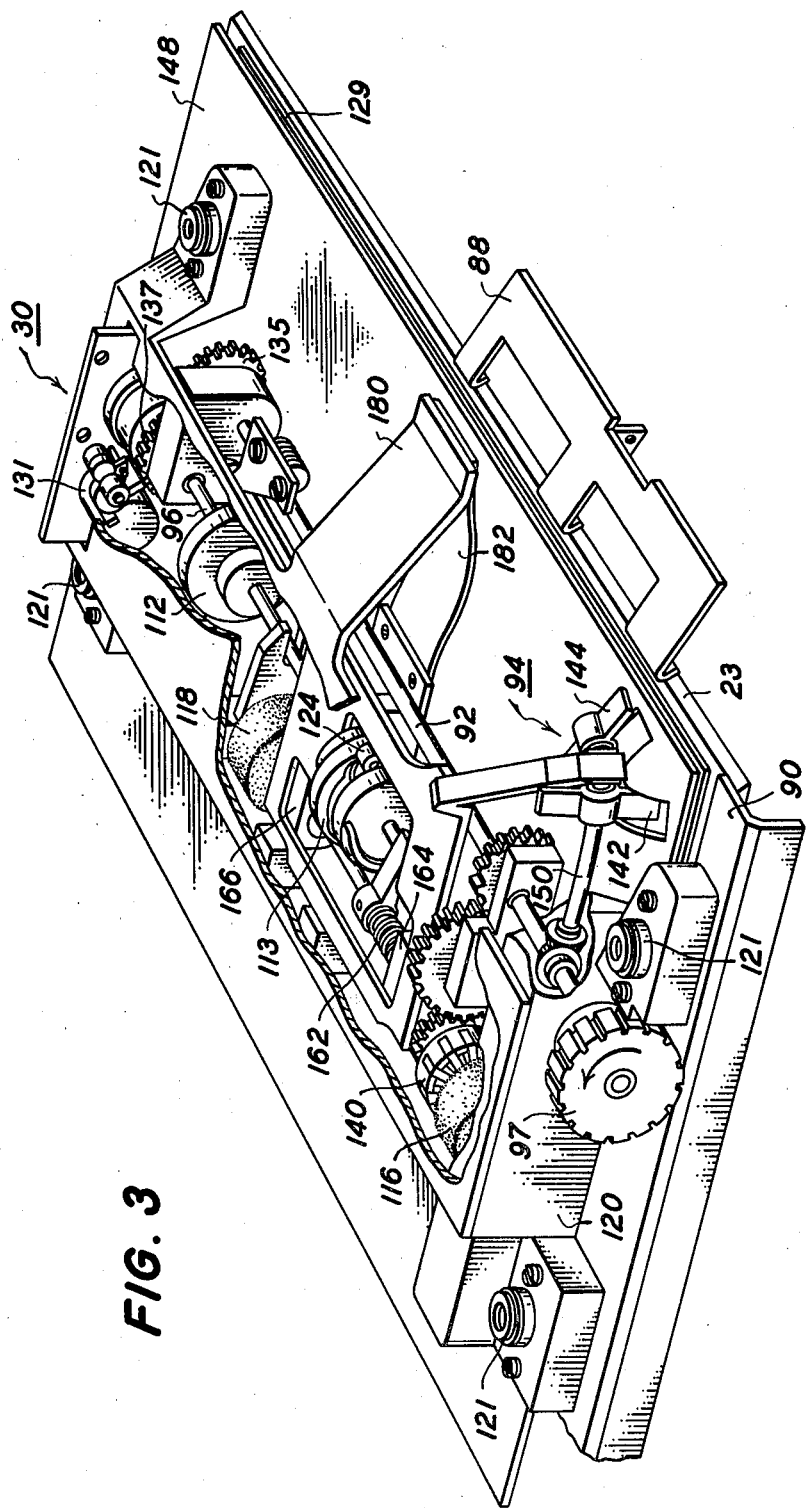
FIG. 3 is a perspective view showing a document registration mechanism for the FIG. 1 copier.
Figure 4:
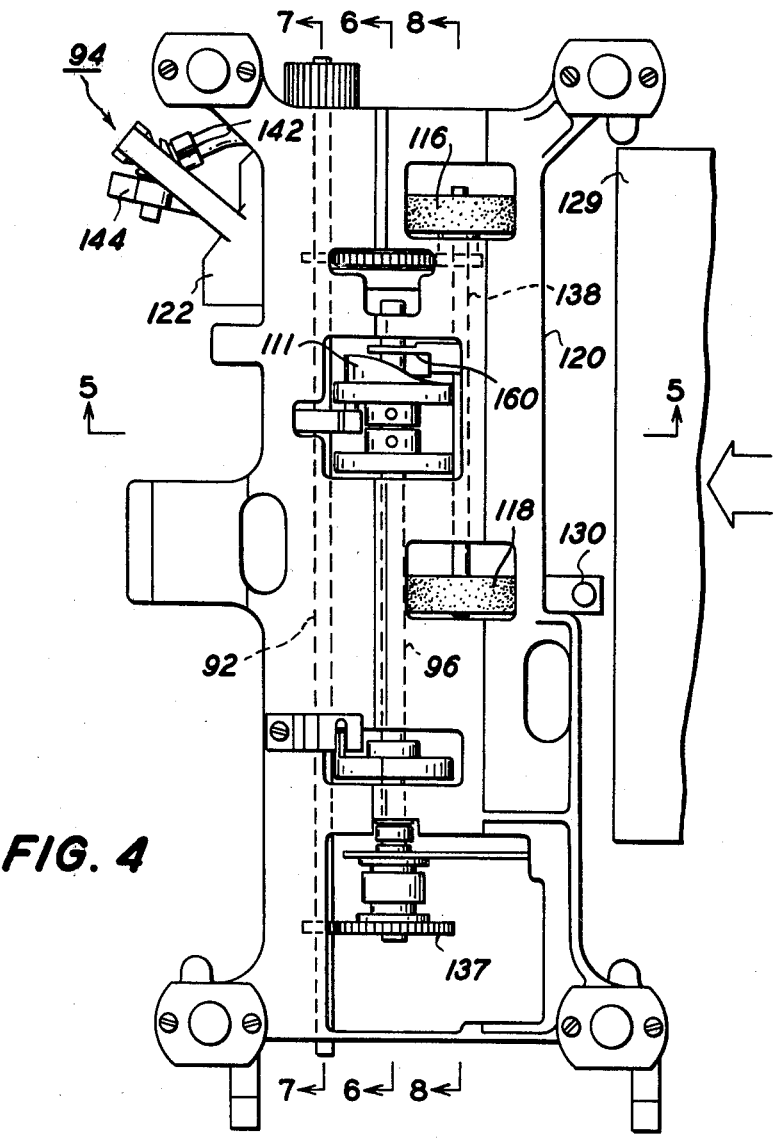
FIG. 4 is a plan view of the FIG. 3 registration mechanism.

The platen registration mechanism 30 in combination with the recirculating document handler 20 registers each document precisely above the platen 23 to insure the document image is properly positioned on the photoreceptor belt 12. The mechanism 30 registers the documents along two mutually orthogonal directions defined by a movable finger 88 of registration gate 32 and stationary edge guide 90 (FIG. 3). The finger 88 is movable in and out of the path of document travel and, accordingly, must have its up and down movement coordinated with document sheet arrival and departure from the platen 23.

The registration mechanism 30 includes a drive shaft 92 (FIG. 3) coupled to an external drive means. The power output of the drive shaft is selectively used to drive a document into register against the finger 88 and edge guide 90, clamp the document against the platen 23 for imaging, and shift a document away from the guide 90 once it has been imaged onto the photoreceptor 12 so that it may be driven from the platen. These functions are accomplished by a corner registering mechanism 94, a cam shaft 96 having a number of cam surfaces 110–113, and a pair of drive rollers 116, 118.

Both the drive shaft 92 and the cam shaft 96 are journaled for rotation in a platen support frame 120 fixed with respect to the platen 23. The support frame 120 serves as a support for the entire registration mechanism 30. As seen most clearly in FIG. 3, the support frame also comprises a number of threaded studs 121 which allow the support frame 120 to be fixed with respect to the remaining components of the RDH 20. Power is transmitted to the drive shaft 92 through a pulley 97 driven by a belt (not shown) which causes the drive shaft 92 to rotate with a constant speed.

Figure 9:
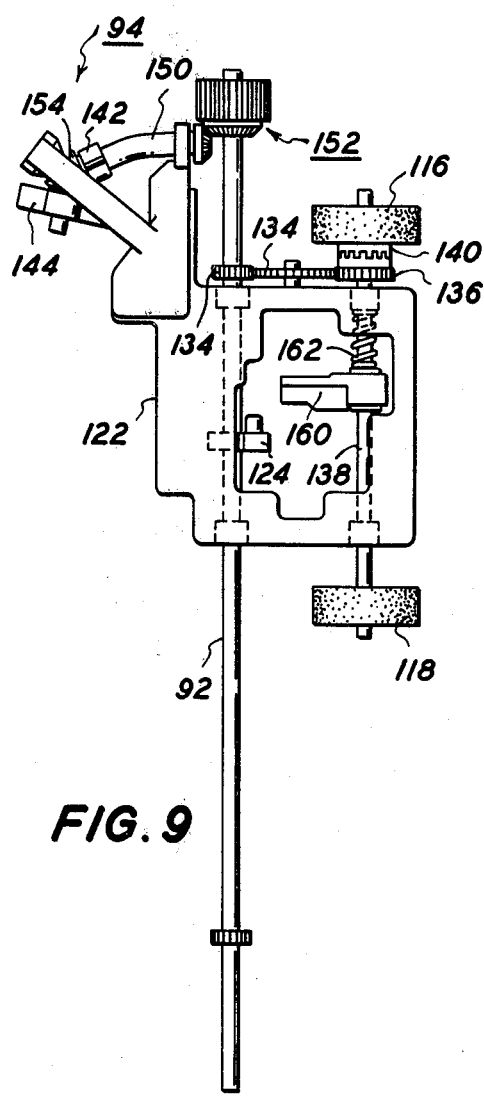
FIG. 9 shows a registration drive train for registering and unregistering the documents driven onto the platen surface.
Figure 10:
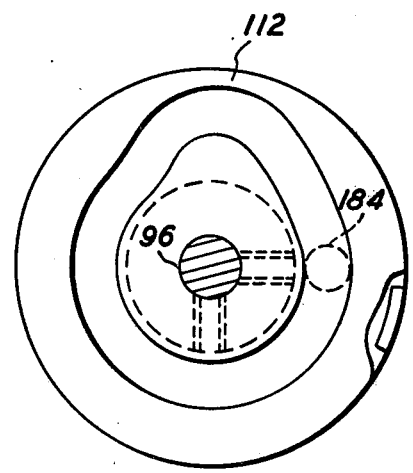
FIG. 10 shows a cam surface profile for raising and lowering a document clamp plate to insure the document is within the copier depth of field.

The drive shaft 92 serves as a pivot axis for a pivoting frame 122 (FIG. 9) to which the corner registering mechanism 94 and drive rollers 116, 118 are connected. Pivoting of the frame 122 is accomplished by driving the cam shaft 96 and its accompanying cam surfaces to move a cam following member 124 coupled to the pivot frame 122. As will be seen, the time durations during which the corner registering mechanism 94 and rollers 116, 118 contact the document are dictated by the angular orientation of the pivoting frame 122, which, in turn, is controlled by the cam shaft orientation. The frame 122 is preferably constructed of a plastic material such as LEXAN 500 (registered trademark) or bulk molding compound (BMC).

Figure 5:
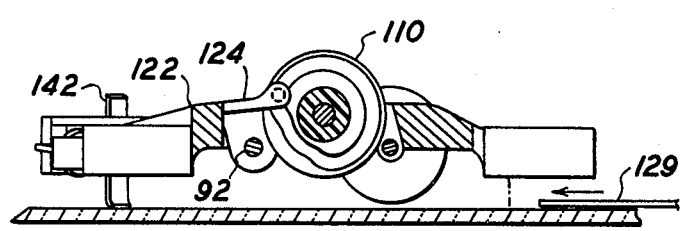
FIG. 5 is a view taken along the line 5—5 in FIG. 4.

The platen registration mechanism 30 cyclically registers each successive sheet in the same manner. Initially, a document 129 (FIG. 5) moves toward the platen along either one of the paths 54, 58 defined by the RDH 20 until a sensor 130 positioned near the platen 23 senses the passage of the document's lead edge. At this time the pivoting frame 122 is orientated so the rollers 116, 118 are in contact with the platen and rotating to drive the document further onto the platen 23. Rotational motion is imparted to the rollers 116, 118 through gears 134 and gear 136 which drive a roller shaft 138.

The sensor 130 generates a signal to the controller 100 which after a delay sufficient to allow the document to reach the platen energizes a solenoid 131. Solenoid 131 causes a clutch 133 to engage which, in turn, causes the cam shaft 96 to begin rotating. Power is transmitted to the cam shaft 96 from the drive shaft 92 through two gears 135, 137.

The clutch 133 is a two step wrap spring clutch which rotates the cam shaft 96 through 270° on its first shaft engagement. This initial rotation causes a number of movements to occur. As a first step the support 122 is pivoted so the rollers 116, 118 disengage from the document and cause the corner registering mechanism 94 to engage the sheet and drive it against the finger 88 and edge guide 90.

The pivoting action is caused by coaction between the cam follower 124 mounted to the frame 122 and one of the cam surfaces 110. Since the follower is rigidly fixed with respect to the support 122 variations in the shape of the surface 110 exert torques about the support's pivot axis as defined by the drive shaft 92.

The corner registering mechanism 94 comprises a pair of paddle wheels 142, 144 rotatably supported by the frame 122 to engage the document at different angles with respect to the corner. Thus, a first wheel 142 tends to drive the document primarily against the edge guide 90 and the second paddle wheel 144 tends to drive the document against the finger 88. To contact the platen 23 the wheels 142, 144 extend through openings 146 in a copier clamp plate 148. The paddle wheels 142, 144 are driven through a flexible coupling 150 connected to a bevel gear 152 mounted to the drive shaft 92. The angled relationship between the wheels 142, 144 is accommodated by a second bevel gear 154 which transmits power to the second paddle wheel 144. The paddle wheels 142, 144 each have two blades or paddles made from urethane which intermittently exert corner registering forces on the document.

At the same time the paddle wheels 142, 144 are driving the document into corner registration, the drive rollers 116, 118 are side shifted toward the edge guide 90 along a direction parallel to the drive shaft 92. This side shifting is performed while the drive rollers 116, 118 are pivoted away from the document and is accomplished by a second cam surface 111 exerting a force against a cam follower 160 fixed to the roller shaft 138. As this side shifting occurs a detent clutch 140 is disengaged so the drive rollers 116, 118 stop spinning with respect to the platen 23. The driving force of the cam surface 111 compresses a spring 162 mounted between the cam follower 160 and one of two bearings 164, 166 which support the rollers 116, 118. The spring 162 provides a mechanism for moving the rollers 116, 118 away from the edge guide 90 after the document has been imaged.

Figure 6:
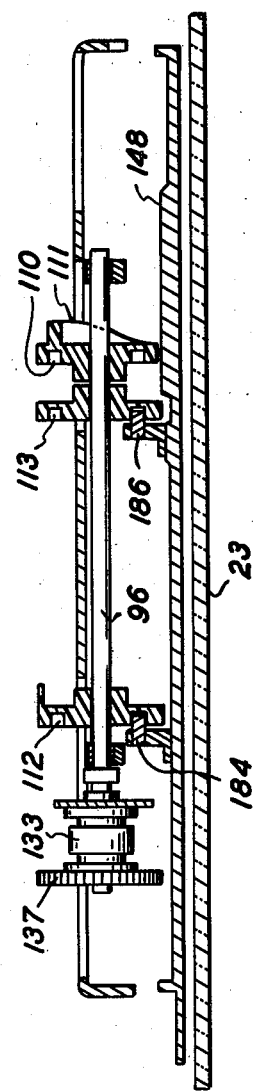
FIG. 6 is a view taken along the line 6—6 in FIG. 4.
Figure 7:
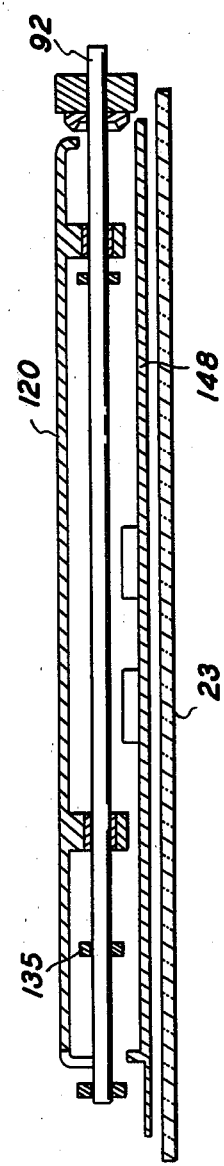
FIG. 7 is a view taken along the line 7—7 in FIG. 4.
Figure 8:
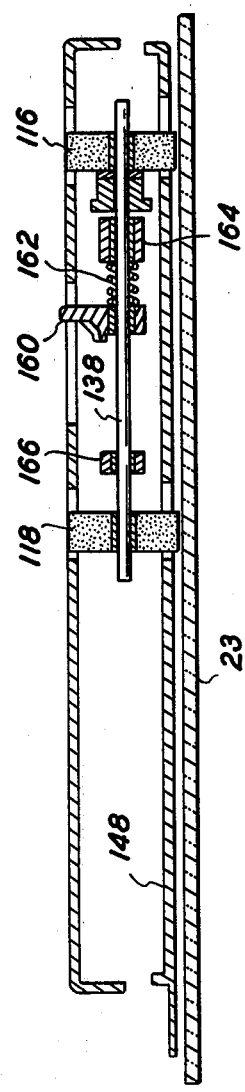
FIG. 8 is a view taken along the line 8—8 in FIG. 4.

Once the document has been corner registered against the finger 88 and guide 90 the corner registration mechanism 94 is disengaged from the document and the clamp plate 148 pressed against the document to flatten it insuring it is within the copier's depth of field. Downward clamp movement is provided by coaction between two other cam surfaces 112, 113 and two cam followers 184, 186 (FIG. 6) attached to the clamp 148. As the document is being corner registered, the cam surfaces 112, 113 are configured to keep the clamp 148 positioned above the document but as the cam shaft approaches the end of its first 270° of rotation the plate 148 is forced down to flatten the document. The clamp 148 is also connected to two support arms 180 (only one of which is shown in FIG. 3) by leaf springs 182. The leaf springs assist the cam shaft in both raising and lowering the clamp plate 148. With the clamp plate 148 in a raised position the leaf springs 182 exert a downward force on the clamp to help initiate movement toward the platen 23. With the clamp lowered, the leaf springs exert an upward face on the clamp to assist in raising the clamp once the document has been imaged.

At the end of the 270° of cam shaft rotation the document is registered against the edge 90 and finger 88, the rollers 116, 118 and corner registration mechanism 94 are balanced about the pivot axis defined by the drive shaft 92, and the clamp plate 148 flattens the document against the platen 23 in the copier's depth of field. As the cam shaft ends its first 270° of rotation the rollers 116, 118 have been side shifted toward the guide 90 in preparation for driving the document away from the edge 90 so it may be moved from the platen 23 to the tray 22.

After the above steps have been accomplished the cam shaft clutch 134 is disengaged while the document is imaged. It should be recalled that the registration of the document must be achieved quite rapidly since the throughput of the RDH 20 is greater than one document per second. In an exemplary registration routine the controller 100 is programmed to initiate document imaging 0.2 seconds after the solenoid 131 is initially energized and cam shaft rotation started. In a copier using a flash document illumination system a sensor (not shown) senses the flash and transmits a signal to the controller 100 indicating the document has been imaged and can now be removed from the platen 23. Accordingly, the controller again energizes the solenoid 131 which engages the clutch 134 initiating the next 90° of cam shaft rotation.

The second phase of cam shaft rotation simultaneously raises the clamp plate 148 and pivots the frame 122, urging the rollers 116, 118 into contact with the document. The raising of the plate 148 occurs due to the profile of the two identical cam surfaces 112, 113. As cam shaft rotation is re-initiated the followers 184, 186 in conjunction with the springs 182 lift the clamp plate from the document. At the same time follower 124 is driven by cam surface 110 to pivot the support 122 lowering the rollers 116, 118 onto the document.

The cam profile 111 is configured to side shift the document away from the edge guide 90 once the clamp plate 148 has been lifted from the document. Due to the earlier compression of the spring 162 a driving force is exerted on the rollers 116, 118 which is counterbalanced by the cam surface 111. As the profile 111 is rotated the side force on the rollers shifts those rollers and the document they frictionally engage away from the edge 90 toward the center of the platen 23. As this side shifting continues, the detent clutch 140 engages causing the rollers 116, 118 to rotate which in turn drives the document from the platen to the inverter 42 and then to the tray 22.

After the second phase of cam shaft rotation has been completed (i.e. the last 90° of rotation performed) the clutch 134 is disengaged and the cam shaft 96 stops rotating. The drive wheels, however, continue to rotate in anticipation of the arrival of the next of a series of documents delivered from the tray 22. This position, in which the rollers 116, 118 contact the platen 23 and the corner registering mechanism 94 is pivoted away from the platen 23 is the initial position and, therefore, the registration cycle is complete.

Figure 11:
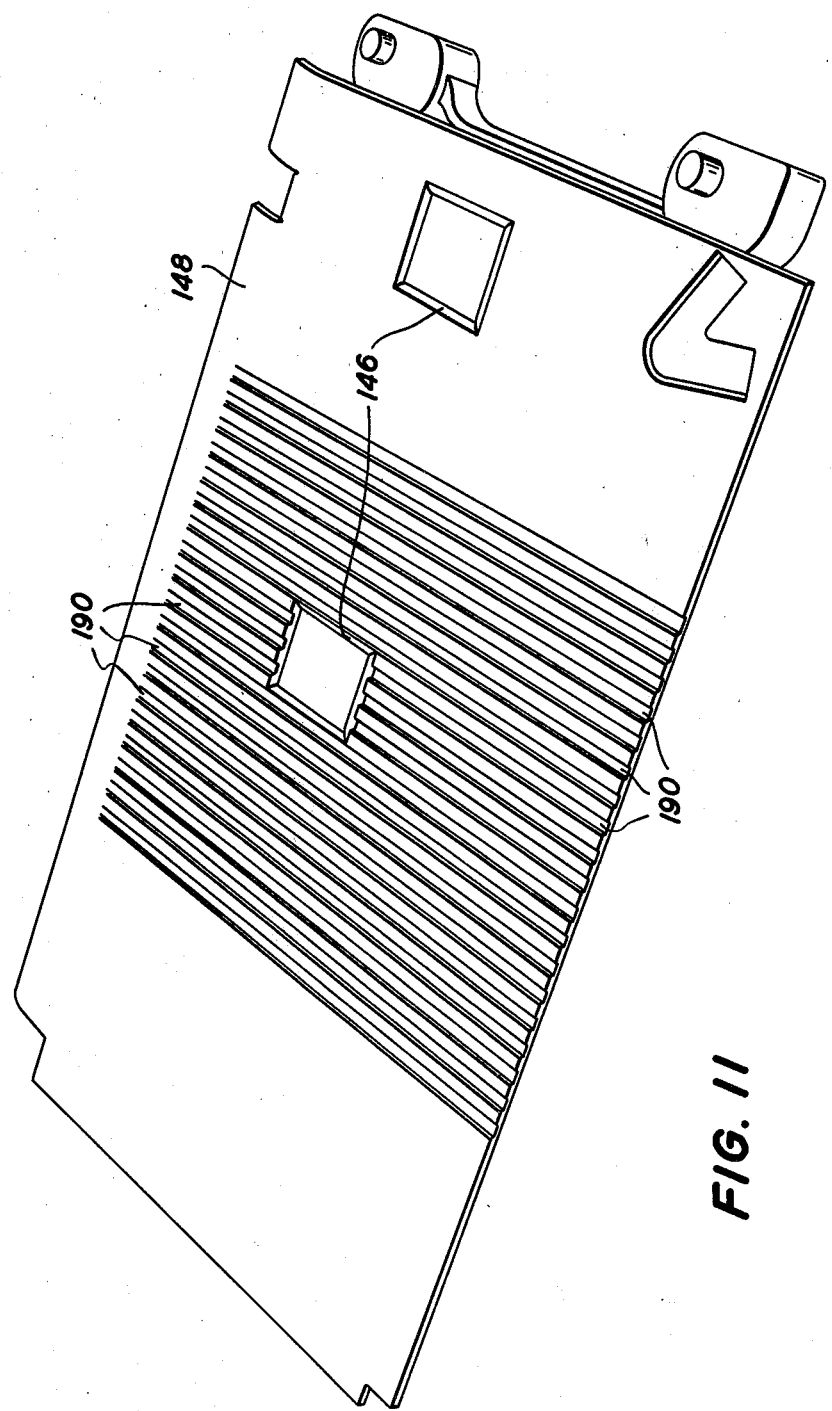
FIG. 11 is a view showing a bottom surface of the document clamp plate.

The clamp plate's bottom surface (FIG. 11) comprises a thin layer of plastic material having a white appearance. Running along this bottom surface in a direction parallel to document travel are a series of slots 190. These slots 190 prevent all the air between the clamp 148 and the document from being squeezed out from under the clamp. This precaution reduces the vacuum created when the clamp rises, improving the clamp rise time and aiding rapid document throughput. The slots are shallow enough so they do not degrade the image even when not completely masked by a document between the clamp and the photoreceptor.

During RDH operation the clamp spends most of its time in the up position as sheets are circulated. The cam shaft may be stopped in either the clamp up or clamp down position under controller supervision. In the clamp up position, for example, the RDH 20 can be utilized to count documents. Alternately, the clamp can be lowered in the manual mode to insure the document is flattened each time the RDH 20 is lowered into its manual copying position.

While the present copier registration scheme has been described with a degree of particularity it should be appreciated that certain alternatives or modifications might be employed. It is the intent that the invention cover all such modifications falling within the spirit or scope of the appended claims.

I claim:

1. Apparatus for repetitively registering successive document sheets above a copier platen comprising:
    (a) drive means for driving said sheets across said platen;
    (b) means for disengaging said drive means to allow two dimensional registration of a particular sheet with respect to said platen;
    (c) means for driving said sheet into registration along two orthogonal registration positions; and
    (d) means for shifting said sheet away from one of said registration positions before said drive means is re-engaged to drive said sheet off said platen.

2. The apparatus of claim 1 which further comprises a cam shaft mounted for rotation and including a series of cam defining surfaces coupled to said means for disengaging, said means for driving, and said means for shifting to coordinate said repetitive registration.

3. The apparatus of claim 2 wherein said drive means comprises a drive shaft coupleable to said cam shaft; and wherein said apparatus further comprises a selectively energizable clutch for coupling said drive shaft to said cam shaft to initialize rotation of said cam shaft and associated cam defining surfaces.

4. The apparatus of claim 1 wherein said drive means comprises drive rollers for engaging and moving each of said successive sheets.

5. The apparatus of claim 1 wherein said means for shifting comprises drive rollers coupled to the drive means and mounted to a shaft movable in a direction of said shifting when said drive wheels engage a registered document.

6. A mechanism for repetitively registering successive document sheets above a copier platen comprising:
    (a) drive means for driving said sheets across said platen;
    (b) means for disengaging said drive means to allow two dimensional registration of a particular sheet with respect to said platen;
    (c) means for driving said sheet against registration guides positioned along two mutually perpendicular platen edges to achieve said two dimensional registration; and (d) means for moving the drive means into engagement with said registered sheet for both shifting said sheet away from one of said registration guides and for driving said sheet off said platen.

7. The mechanism of claim 6 which further comprises a drive shaft coupled to said drive means, said means for driving, and said means for moving through a cam shaft which rotates a series of camming surfaces to coordinate activation of said drive means, said means for driving and said means for moving.

8. The mechanism of claim 7 which further comprises clamp means for flattening said sheets against said platen once they are positioned along said two mutually perpendicular platen edges.

9. The mechanism of claim 8 wherein said clamp means defines a series of slots for reducing attraction between the clamp means and the platen as the clamp means are moved away from the document.

10. A process for two dimensional registering a series of successive document originals above a transparent copier platen comprising the steps of:
(a) driving a document onto said platen with a drive roller;
(b) disengaging said drive roller from said document;
(c) driving said document into corner registration on said platen;
(d) contacting said corner registered document with said drive roller;
(e) shifting said drive roller along a direction parallel to an axis of drive roller rotation to re-position said document in relation to said platen;
(f) driving said document from said platen; and
(g) repeating steps a-f for successive documents.

11. The process of claim 10 which further comprises the step of exposing a photoconductive imaging surface with an image of said corner registered document.

12. The process of claim 11 which further comprises the step of flattening the registered document on the platen to maintain the original within an optical system depth of field.

13. In a copier, a process comprising the steps of moving a document original along an input path to a platen for copying, stopping said document at an initial position on said platen, repositioning said document on said platen to a registration position so that an image of said original will be properly aligned on said copier photoreceptor, clamping said original to said platen to insure said document is within a copier imaging depth of field, transmitting said image to said photoreceptor, jogging said document away from said registration position, and removing said document from said platen along an exit path.

* * * * *